United States Patent
Garcia Arrieta et al.

(10) Patent No.: US 9,517,443 B2
(45) Date of Patent: Dec. 13, 2016

(54) DEVICE FOR POLYMERIZING LACTAMS IN MOLDS

(71) Applicant: FUNDACION TECNALIA RESEARCH & INNOVATION, Donostia-San Sebastian (Gipuzkoa) (ES)

(72) Inventors: Sonia Garcia Arrieta, Donostia-San Sebastian (ES); Unai Morales Diez, Donostia-San Sebastian (ES); Cristina Elizetxea Ezeiza, Donostia-San Sebastian (ES); M Amaia De La Calle Lizarazu, Donostia-San Sebastian (ES); Jose Ignacio Hernandez Vicente, Donostia-San Sebastian (ES); Pablo Casado Francisco, Donostia-San Sebastian (ES); Mikel Liceaga Ontoria, Donostia-San Sebastian (ES)

(73) Assignee: FUNDACION TECNALIA RESEARCH & INNOVATION, Donostia-San Sebastian (Gipuzkoa) (ES)

(*) Notice: Subject to any disclaimer, the term of this patent is extended or adjusted under 35 U.S.C. 154(b) by 442 days.

(21) Appl. No.: 14/104,740

(22) Filed: Dec. 12, 2013

(65) Prior Publication Data
US 2014/0178268 A1 Jun. 26, 2014

(30) Foreign Application Priority Data
Dec. 13, 2012 (EP) .................. 12382499

(51) Int. Cl.
*B01J 19/00* (2006.01)
*B01J 4/02* (2006.01)
(Continued)

(52) U.S. Cl.
CPC ............. *B01J 4/02* (2013.01); *B29B 7/7457* (2013.01); *B29C 67/246* (2013.01); *B29K 2077/00* (2013.01)

(58) Field of Classification Search
CPC ........ B01J 19/00; B01J 19/0013; B01J 19/24; B01J 2208/00938; B01J 2219/00051; B01J 2219/00087
(Continued)

(56) References Cited

U.S. PATENT DOCUMENTS

2005/0226794 A1* 10/2005 Hodge .................. G05B 15/02
  422/243
2011/0148000 A1* 6/2011 Garcia Arrieta ........ B29B 7/407
  264/334

FOREIGN PATENT DOCUMENTS

EP 2338665 A1 6/2011

\* cited by examiner

*Primary Examiner* — Jill Warden
*Assistant Examiner* — Dwayne K Handy
(74) *Attorney, Agent, or Firm* — Cantor Colburn LLP

(57) ABSTRACT

A device for polymerizing lactams in molds, comprising: a reservoir for storing lactam, wherein said reservoir is kept at a temperature which varies in the range of 135-150° C. for melting the lactam and keeping it in melted state; lactam feeding means comprising dosing pipes for feeding the lactam from the reservoir, first dosing means for feeding an initiator; second dosing means for feeding an activator; a mixing head configured to receive the lactam, the initiator and the activator from respectively said lactam feeding means, said first dosing means and said second dosing means. The initiator and activator are liquid, and the cited reservoir and lactam feeding means are located within a heater configured to maintain the temperature of the lactam at a substantially constant value until it reaches the mixing head.

11 Claims, 2 Drawing Sheets

(51) Int. Cl.
*B29B 7/74* (2006.01)
*B29C 67/24* (2006.01)
*B29K 77/00* (2006.01)

(58) Field of Classification Search
USPC .................................................. 422/129, 130
See application file for complete search history.

DEVICE FOR POLYMERIZING LACTAMS IN MOLDS

TECHNICAL FIELD

The present invention relates to the techniques used in the chemical industry for polymerizing lactams and, more particularly, it relates to a system for polymerizing lactams in molds.

BACKGROUND

The polymerization of lactams in molds has been used and studied for several decades. The latest efforts in improving the technique of polymerization of lactams have been focused on modifying the catalytic system (composed by activator and initiator) to carry out the polymerization in a controlled and selective manner. However, the way in which the basic ingredients are mixed and fed to the mold has not changed and is still basically one of the following two forms: In the first form, two independent pre-mixtures are prepared, the first one comprises a mixture of the activator and a fraction of the lactam; and the second one consists of the initiator and the remaining fraction of the lactam. Both pre-mixtures are subsequently combined to carry out the polymerization.

The previous techniques allow producing serial parts of a composition, but they are not suitable in the continuous manufacture of non-serial parts, for example with individual sizes and/or geometries, different compositions or characteristics.

European patent application EP2338665A1 describes a process and device for polymerizing lactams in molds, wherein the lactam, activator and initiator are independently fed and dosed to a mixing head feeding a mold. The described process for polymerizing lactams can be catalyzed by a great deal of initiators and activators, some of them being solid. Solid initiators and activators must be melted and kept at high temperatures during the whole process. The described device for molding lactams is versatile for a great deal of initiators and activators. Such versatility makes the use of the device difficult, since heating means are required in each and every dosing elements of the circuit through which each of those materials (initiators or activators) passes. The three components (lactam, activator and initiator) of the polymerization process are dosed separately. This leads to two of the advantages of the described process: (1) stability in time is assured and (2) different dosing (in %) of each component is permitted for each type of pieces or parts to be manufactured.

However, it has been observed that melting and dosing the activator and the initiator at high temperatures is difficult. Besides, both materials must be added to the mix in very specific percentages, which complicates their correct dosing by means of conventional gear pumps. Furthermore, since solid initiators and activators must be melted at higher temperatures than room temperature, and their melted state presents viscosities which are dependent on temperature, their temperature must be kept constant and precise during the whole process of dosing.

The different elements of the device described in EP2338665A1 are each heated independently from each other, by means of individual heating systems, either electric systems based on resistances or by means of thermic fluids. However, individual heating of those elements cause a cold area in the connection element (by valves, nuts or any other connection elements) between each pair of elements. For example, the caprolactam becomes solid at a temperature lower than 70° C., and these cold points can produce cooling and subsequent solidification of the monomer, thus producing blockage in the dosing systems.

In sum, a device is needed, which enables to solve in an efficient way, the above mentioned problems of conventional processes and devices for polymerizing lactams in molds.

BRIEF SUMMARY

A device is provided for polymerizing lactams in molds, wherein the three components of the polymerizing reaction (lactam, initiator and activator) are fed and dosed to a mixing head independently from each other, the initiator and activator being liquid at room temperature.

According to an aspect of the present invention, there is provided a device for polymerizing lactams in molds, comprising: a reservoir for storing lactam, wherein said reservoir is kept at a temperature which varies in the range of 135-150° C. for melting the lactam and keeping it in melted state; lactam feeding means comprising dosing pipes for feeding the lactam from the reservoir; first dosing means for feeding an initiator; second dosing means for feeding an activator; a mixing head configured to receive the lactam, the initiator and the activator from respectively said lactam feeding means, said first dosing means and said second dosing means, the mixing head having three independent inlets for independently receiving the lactam, the initiator and the activator, to allow said lactam, initiator and activator respectively flow within the mixing head without mixing each other until the output of the mixing head is reached; and a mixing pipe located at the output of said mixing head and configured to put the lactam, initiator and activator in contact for the first time, in such a way that they are mixed up. The initiator and activator are liquid. The cited reservoir and lactam feeding means are located within a heater configured to maintain the temperature of the lactam at a substantially constant value until it reaches the mixing head.

In a preferred embodiment, the lactam feeding means comprises a pump configured to pump the lactam from the reservoir and to dose it towards the mixing head, the pump being located within the heater. More preferably, the device also comprises an engine for controlling the dosing of the pump, the engine being outside said heater and joined to the pump by means of a shaft passing through a wall of said heater.

The lactam feeding means preferably comprises a pressure meter configured to stop the pump in the event of overpressure, said pressure meter being located inside said heater, thus maintaining the temperature of said pressure meter at a substantially constant value. In a particular embodiment, the pressure meter further comprises an electric connector housed in an insulating layer of the heater.

Preferably, the lactam feeding means further comprises a relief valve configured to be mechanically activated for clearing the lactam in the event of exceeding a maximum working pressure, said relief valve being located within said heater, thus maintaining the temperature of said relief valve at a substantially constant value.

Preferably, the lactam feeding means further comprises a three-ways valve located between the reservoir and the pump, for enabling the communication of the material flow from the reservoir to the pump, or from the reservoir to a drainpipe for clearing the reservoir, said three-ways valve being located within said heater, thus maintaining the temperature of said three-ways valve at a substantially constant value. In a particular embodiment, the three-ways valve further comprises activation means placed outside the heater, the activation means joined to the three-ways valve by means of a shaft passing through a bulkhead of a wall of the heater.

Preferably, the device comprises an electro valve configured to open when the pump is working and to close when the pump stops, preventing dripping, once the dosing of the lactam is completed, said electro valve being located in an insulating layer of said heater.

Preferably the mixing head comprises a radial inlet for the lactam, a first inlet for the initiator and a second inlet for the activator, the first inlet being connected to a first pipe and the second inlet to a second pipe, so that the lactam flow enters the mixing head perpendicular to the output shaft while the initiator and activator enter in parallel, such that the initiator and activator come out (and enter the mixing pipe) by the central part of the mixing head while the lactam flow does it by the perimeter part.

Preferably, the first dosing means for feeding the initiator comprises a syringe driver joined to the first inlet of the mixing head.

Preferably, the second dosing means for feeding the activator comprises a syringe driver joined to the second inlet of the mixing head.

The mixing head is preferably tempered by means of flat resistances, in order to prevent solidification of the lactam and keep the temperature of the mix under control.

The mixing pipe is preferably a static mixer.

In use, the temperature inside the heater is preferably between 100° C. and 115° C.

The device preferably comprises an electric resistor surrounding the reservoir configured to increase the temperature of the lactam inside the reservoir so that the lactam reaches a temperature between 135° C. and 150° C.

Additional advantages and features of the invention will become apparent from the detail description that follows and will be particularly pointed out in the appended claims.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DETAILED DESCRIPTION

Figure 1:
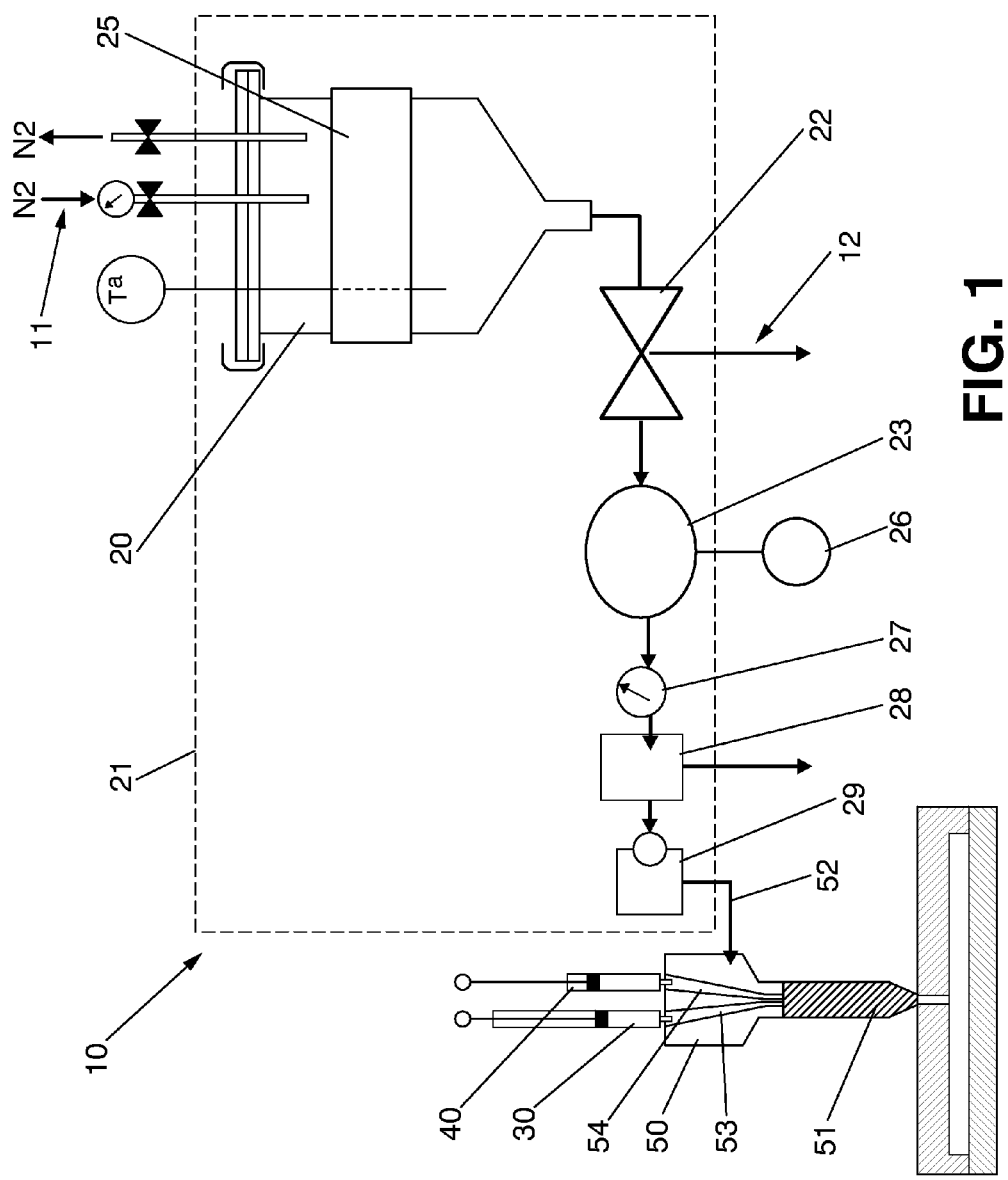
FIG. 1 is a diagram schematically showing a device according to an embodiment of the present invention.

In this text, the term "comprises" and its derivations (such as "comprising", etc.) should not be understood in an excluding sense, that is, these terms should not be interpreted as excluding the possibility that what is described and defined may include further elements, steps, etc.

In the context of the present invention, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

The following description is not to be taken in a limiting sense but is given solely for the purpose of describing the broad principles of the invention. Next embodiments of the invention will be described by way of example, with reference to the above-mentioned drawings showing apparatuses and results according to the invention.

The procedure for polymerizing lactams in molds of the present invention comprises: feeding, in a mixing head, a lactam, an activator and an initiator, wherein the activator and the initiator are liquid at room temperature. The lactam, the initiator and the activator are independently fed in the mixing head.

The lactam can be selected for example from the group comprising β-lactam, γ-lactam, δ-lactam, ε-caprolactam and laurolactam, etc.

The initiator can be isocyanates and derivatives thereof, as well as acyl-lactams, ureas and carboimides, provided they are liquid at room temperature.

The activator can be lactamates of alkali metals such as metal salts of sodium or magnesium, hydrates, hydroxides and metal amines or other organometallic compounds, provided they are liquid at room temperature.

The control of the final mechanical properties of the molded material is achieved by acting on the concentration of the catalytic system (activator and initiator) and/or the combination of several lactams, and the process and post-process conditions.

Next, a device for polymerizing lactams in molds is described. The lactam is introduced in a heated reservoir, wherein it is melted. Once melted, the lactam is taken from the reservoir to a mixing head, through a dosing and pumping system, everything heated. The melted lactam enters the mixing head at the same time as the initiator and activator, which are placed in two independent dosing devices (preferably dosing by means of piston at room temperature). Initiator and activator enter the mixing head through two independent pipes, which pass through it until its outside is reached, where a static mixer is placed. It is at the entrance of this static mixer where the three components (lactam, initiator and activator) are in contact for the first time, the three components being mixed up when they pass through its internal helixes and coming out from the static mixer totally mixed up.

A problem solved by the device of the invention is related to the difficulty in melting and dosing both the initiator and the activator at high temperatures. Both materials must be added to the mix in specific percentages (for example, in the range of 0.5-2% in weight with respect to the lactam weight), which makes difficult its correct dosing by means of gear pumps. Besides, as already explained, solid initiators and activators must be melted at temperatures higher than room temperature. Furthermore, when melted, these initiators and activators present viscosities which are temperature-dependent. As a consequence, the temperature of these materials must be constant and precise in the course of the whole process of dosing.

Thus, catalytic systems (initiators and activators) which are liquid and stable at room temperature are used. This permits to simplify the polymerization process and the molding of lactams and to simplify the device used therefor. This simplification involves an important reduction in the number of elements which form the device, mainly thermal elements and number of containers and dosing pipes.

Besides, the new device, based on more simple elements, permits a more exact dosing of each component, thanks to control means based on a software which automatically calculates the working parameters of the device (speeds and working times of the dosing systems) from the final volume of the part or piece to be manufactured and the percentage of lactam, initiator and activator to be used.

Referring to FIG. 1, a diagram schematically showing a device according to an embodiment of the invention is shown. The system 10 comprises a lactam reservoir 20 for storing the lactam. The reservoir 20 preferably keeps the lactam under an inert atmosphere such as, for example, a nitrogen atmosphere, which is fed through the upper part 11 of the reservoir, and preferably at a temperature between 135-150° C. From the reservoir 20, the lactam is metered to a mixing head 50, which is described in detail later.

The lactam is taken to the mixing head 50 through a feeding system described next. Dosing of the lactam from the reservoir 20 to the mixing head 50 is achieved by means of a pumping system. The pumping system comprises a pump 23. In a particular embodiment, the pump 23 is a volumetric gear pump.

The pumping system also comprises an engine 26. Dosing of the pump 23 is controlled by the engine 26, which is capable of regulating both the rotational speed (flow control) and the number of revolutions (volume control). This engine 26 is placed outside the heater (which is introduced and described later in this text). Optionally, the pumping system also comprises a speed reducer installed in the engine 26.

The device (system 10) preferably comprises securing means for providing protection against overpressure. They are introduced at the feeding system and are: a pressure meter 27 configured to stop the pump 23 in the event of overpressure; and/or a safety valve (or relief valve) 28 configured to be mechanically activated for clearing the liquid lactam in the event of exceeding a maximum working pressure. In a preferred embodiment, the maximum working pressure is established in around 5 bars. The pressure meter 27 acts as protection for the pump against overpressure which might occur. The goal is that, if overpressure occurs due to blockage or to misoperation of the circuit, the pressure meter 27 communicates with the pump and switches the engine off. The relief valve 28 acts also as protection against overpressure.

Besides, the device preferably comprises a three-way valve 22 located between the reservoir 20 and the pump 23, for enabling the communication of the material flow from the reservoir 20 to the pump 23, or from the reservoir 20 to a drainpipe 12 which permits the clearing of the reservoir (20). The three-way valve 22 preferably comprises an elongated axis, in such a way that it can pass through the bulkhead of the heater 21 thus permitting the driving means to be located outside the heater (not described yet).

The last component of the feeding system before the inlet of the mixing head 50 is an electro valve 29 which is configured to open when the pump is in operation and to close, preventing dripping, once the dosing of the lactam is completed (pump in resting position). The goal of this electro valve 29 is to prevent the lactam from leaking once the pump has stopped. This electro valve 29 is preferably built in the isolation of the heater 21 (not described yet) and is heated by means of a resistor which preferably takes the form of a clamp.

The above-described elements (reservoir 20, pump 23, securing system (pressure meter 27 and/or a safety valve 28), electro valve 29 and lactam feeding system in general), are located within a heater 21 configured to maintain all the elements which are in contact with the lactam, at a temperature between 100° C. and 115° C. At such temperature, solidification of the lactam due to cooling is prevented (solidification of lactams occurs at around 70-80° C.). As already mentioned, the engine 26 is placed outside the heater 21.

On the other hand, the initiator and the activator are placed in respective dosing devices 30 40, which are independent from each other. In a preferred embodiment, these dosing devices 30 40 are piston pumps, such as syringe drivers located near the mixing head 50, as illustrated in FIG. 1. The syringe drivers are formed by an engine which rotates a spindle at the end part of which the plunger (piston) of the syringe is fixed. Two syringe drivers are used, one per component (initiator and activator). The dosing devices 30 40 are outside the heater 21. They are at room temperature. By controlling the advance of the piston, the flow and volume of doses are controlled. In order to join the syringes to the mixing head 50, flexible hosepipes are used, for example made of silicone. Apart from permitting precise control of the dosing, syringe drivers are recommended because their elements which are in contact with the activator and initiator (plastic syringes and silicon pipes) are disposable. This solves the problem of cleaning them. The control of dosing is thus independent and changing the ratio between these components is possible.

The exact dosage control is achieved by a spindle attached to an engine with encoder. Therefore, the volume of flow is regulated by the rotational speed of the engine and the dosing volume is regulated via the encoder based on the number of revolutions.

As already mentioned, the melted lactam enters the mixing head 50 at the same time as the initiator and activator. The three materials (lactam, initiator and activator) flow along independent pipes 52 53 54 within the mixing head 50 until the output of the mixing head 50 is reached. There a static mixer 51 is placed. It is at the entrance of this static mixer 51 where the three components (lactam, initiator and activator) are in contact for the first time, the three components being mixed up when they pass through its internal helixes and coming out from the static mixer totally mixed up.

The mixing head 50 is tri-component, that is to say, it has three independent inlets and a single outlet. The mixing head 50 is preferably tempered by means of flat resistances, in order to prevent solidification of the lactam and keep the temperature of the mix under control.

The mix ratio of each of the three components is controlled by fixing the flow of the lactam pump 23 and of the piston dosing means 30 40 (for the activator and initiator), in such a way that the relationship between the three volumes of flow matches the mix ratio required for the correct polymerization.

Preferably the mixing head is made of stainless steel. Also preferably, it is composed of two parts: head support through which the lactam is inserted laterally (radially to the shaft of the mixer), and head shaft through which the catalytic system (activator and initiator) is inserted by the top. Pipes that are in contact only with the activator and initiator are passed through two holes at the top. This is illustrated in FIG. 1.

Figure 2:
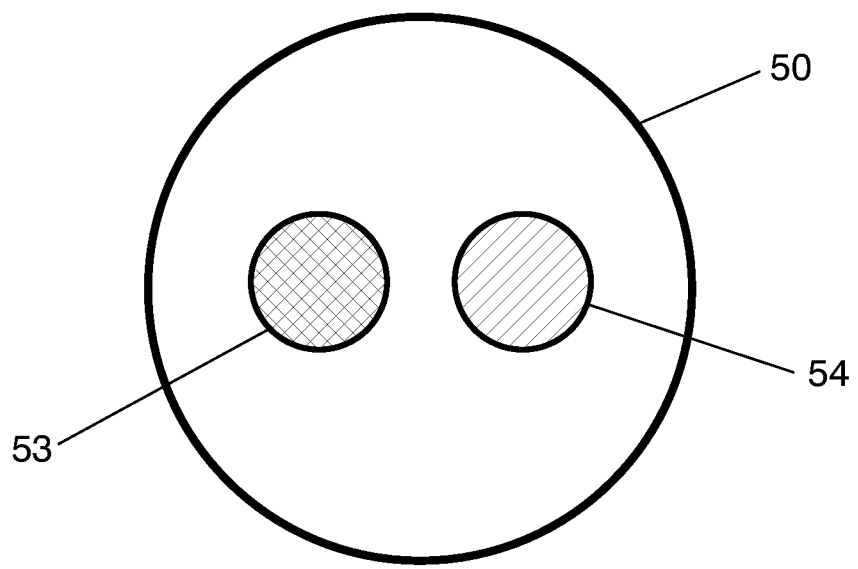
FIG. 2 shows the outcome section of the mixing head towards the mixer, according to an embodiment of the present invention.

The tri-component head is intended for leading the three material flows, lactam, activator and initiator to the static mixer without coming into contact. The lactam flow enters the mixing head perpendicular to the output shaft while the initiator and activator enter in parallel. The objective is that the catalytic system (initiator and activator) comes out by the central part of the mixing head while the lactam flow does it by the perimeter part, as shown in FIG. 2. The materials contact each other only when they are out of this piece and begin to enter the mixing pipe.

Due to the fact that a static mixer has been used and no commercial three-input heads exist in the market, a new three-input head has been implemented.

The three components (lactam, initiator and activator) are mixed within the static mixer 51, which is located at the output of the mixing head 50. The mixing head 50 discharges its content to this static mixer 51. One skilled in the art will understand that the mixer 51 is static because its helixes do not move (they are not propellers). The static mixer 51 preferably has in its interior a geometric configuration which combines a defined number of helixes, which are placed forming a 90° angle with respect to the following one. The resulting mix is lead to the pre-heated mold (at around 170-180° C.), wherein the polymerization reaction is produced. The molding process is performed at low pressure (0 to 3 bars) according to the volume, geometry of the part to be obtained and expected filling time; the precise temperature for the molding depends on the expected rate of reaction and to the percentage of catalyst and initiator used.

The control of all the components, either electric or pneumatic, is centralized in control means, for example an electrical cabinet, wherein a computer having specific control software has been installed. This control means is not illustrated in FIG. 1. A computer used for the control of all the elements of the process allows the control of the temperature resistors and the pump engine. Also it monitors the pressure signals of the lactam feeding system and the nitrogen inside the reservoir, and the mold temperature signal.

Coming back to the heating means used to keep tempered the system through which the lactam flows, a heater 21 has been used, within which all the non-electric elements of the lactam feeding means have been placed. These non-electric elements are: reservoir, valves, pump, dosing pipes and other securing elements. The elements placed within the heater 21 which need electric control (and thus normally do not support temperatures higher than around 110° C.) have been adapted in such a way that its electric part is placed outside the heater 21, through bulkheads at the walls of the heater 21, such as:

Bulkheads for the driving control of the three way valve.
Bulkheads for the connection between the pump body and the engine.
Bulkheads for the pressure meter cable.
Preferably there are also bulkheads in the heater for:
The connection between the lactam feeding means and the mixing head.
The upper lid of the lactam reservoir.
The power cable of the resistance of the lactam reservoir.
Emptying the lactam reservoir.

In order to achieve additional heating of the lactam within the reservoir 20, an electric resistor 25 within the heater 21 is placed, surrounding the reservoir 20. This permits to increase the temperature of the lactam inside the reservoir (which thus reaches a temperature in the range of 135-150° C.

The resistor 25 permits to raise the temperature of the lactam, while maintaining the temperature of the remaining components which are within the heater 21 at a temperature of around 110° C. With the resistor 25, the temperature of the lactam within the reservoir 20 reaches values within the range of 135-150° C.

Due to the reaction of the materials with humidity, with oxygen or with its low stability at high temperature, measuring elements such as flowmeters or PID-controlled proportional valves are discouraged, because these elements are fragile and, in the event of degradation or solidification of the material, such measuring elements might fail or break.

As a consequence, it is necessary to select robust mechanical components, which are besides easy to clean in the event of degradation or solidification of the material, by applying heat, by using dissolvent or by using other cleaning systems.

On the other hand, the use of disposable materials is required for those elements for which optimal cleaning conditions are demanded and cleaning them is complicated. This applies to the materials used in the dosing elements at the catalytic system (activator and initiator).

EXAMPLES OF DIFFERENT ELEMENTS OF THE DEVICE

Example 1

If we want to mold a piece of polyamide 6 of 1.03 kg in 10 seconds (time of filling of the mold) in which the mix ratio is: 100 parts of lactam (in particular, caprolactam), 2 parts of initiator and 1 part of activator, the procedure is described next.

The reservoir 20 is filled with caprolactam and the syringe drivers 30 40 are respectively filled with initiator and activator. The heater 21 is programmed at 115° C. and the reservoir resistor 25 at 135° C. The resistor of the mixing head is programmed to heat at 115° C.

Once the caprolactam is melted, the three dosing systems (caprolactam, initiator and activator) are activated. The gear pump doses the caprolactam from the reservoir 20 through the pipes, until the mixing head 50 with a constant and continuous flow of 100 g/s for 10 seconds.

At the same time/in parallel, the syringe drivers dose the activator and initiator through silicone pipes (pipes) up to the static mixer, with a constant and continuous flow of 2 g/s of initiator and 1 g/s of activator.

The three flows of caprolactam, initiator and activator are in contact with each other for the first time at the inlet of the static mixing pipe (static mixer 51), for obtaining an homogeneous mix and which keeps constant the mix ratio at its output. This output is connected to the heated mold at 170° C., which is filled in a continuous way and in the same 10 seconds during which the dosing of the three components occur. Once the reaction within the mold occurs, the mix becomes solid and the piece of poliamide 6 can be taken out of the mold.

Example 2

Once the process described in example 1 is over, and without needing to switch the machine off, clean it or introducing new raw material (caprolactam, initiator or activator), a second piece of poliamide 6 is manufactured, having a weight of 205 g, in 4 seconds (time of filling of the mold) in which the mix ratio is: 100 parts of caprolactam, 1.5 parts of initiator and 1 part of activator.

The three dosing systems (caprolactam, initiator and activator) are activated. The gear pump doses the caprolactam from the reservoir 20 through the pipes, until the mixing head 50 with a constant and continuous flow of 50 g/s for 4 seconds.

At the same time/in parallel, the syringe drivers dose the activator and initiator through silicone pipes (pipes) up to the static mixer, with a constant and continuous flow of 0.75 g/s of initiator and 1 g/s of activator.

Like in example 1, the three flows of caprolactam, initiator and activator are in contact with each other for the first time at the inlet of the static mixing pipe (static mixer 51), for obtaining a homogeneous mix and which keeps constant the mix ratio at its output. This output is connected to the heated mold at 165° C., which is filled in a continuous way and in the same 4 seconds during which the dosing of the three components occur. Once the reaction within the mold occurs, the mix becomes solid and the piece of poliamide 6 can be taken out of the mold.

Next, a process for molding polyamide 6 at industrial scale using the inventive device is described:

a) Preparation of the materials: it must be ensured that the percentage of humidity of the reaction components is lower than 0.04%.

b) The molds must be heated to the molding temperature.

c) Switching on the equipment: the machine is turned on with the main switch and the temperatures of the heated areas are programmed. These are: the electro valve zone and the head zone that are tempered through external resistances and the heater.

d) The caprolactam is introduced in the reservoir. The amount to be introduced is a function of the parts that one wants to obtain in the work session. The reservoir is closed, it is pressurized with nitrogen up to a maximum of 0.4 bars and the resistance of the tank is programmed.

e) Melting of the caprolactam: When the thermocouple inside the reservoir marks a temperature above 70° C. it can begin to stir gently to help the melting of the caprolactam mass in a homogeneous way. Wait for the time needed until the caprolactam reaches the programmed melting temperature.

f) Verification of the calibration of the caprolactam: prior to the first casting a caprolactam pre-casting is carried out to verify by weighing that the programmed volume of flow matches the real one.

g) Catalytic system load: according to the mixing ratio and part weight that will be used the syringes are loaded and are connected to the corresponding silicone pipes. Finally, they are placed in the corresponding syringe driver introducing the pipes in the mixing head.

h) Verification of the calibration of the catalytic system: To do this, a volume of flow is independently programmed in each driver and the amount is collected in a tared container which will be weighed.

i) Priming of the drivers: a priming of the drivers is carried out such that the activator and the initiator completely fill the silicone pipe.

j) Casting of the material into the mold: the weight of piece to be obtained and the % of catalytic system are programmed, the mixer output is connected to the mold and the casting begins. After filling the mold, the pipe is disconnected and is allowed to react.

k) Cleaning of the mixing pipe: immediately after disconnecting the mold, the mixing pipe is cleaned to remove all traces of caprolactam/initiator/activator mixture.

l) Demolding of the piece: once the material is solidified the cooling of the piece is carried out, after which it is demolded.

m) Repetition casting: if there are going to be carried out several consecutive castings, once finished the step k) you can return to step i) and perform castings into various molds. These castings can have different weight and different % of catalytic system changing only the mixing ratio and part weight in the program.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A device for polymerizing lactams in molds, comprising:

a reservoir for storing lactam, wherein said reservoir is kept at a temperature which varies in the range of 135-150° C. for melting the lactam and keeping it in melted state;

lactam feeding means comprising dosing pipes for feeding the lactam from the reservoir, first dosing means for feeding an initiator;

second dosing means for feeding an activator;

a mixing head configured to receive the lactam, the initiator and the activator from respectively said lactam feeding means, said first dosing means and said second dosing means, the mixing head having three independent inlets for independently receiving the lactam, the initiator and the activator, to allow said lactam, initiator and activator respectively flow within the mixing head without mixing each other until the output of the mixing head is reached; and a mixing pipe located at the output of said mixing head and configured to put the lactam, initiator and activator in contact for the first time, in such a way that they are mixed up;

wherein said initiator and activator are liquid, and the cited reservoir and lactam feeding means are located within a heater configured to maintain the temperature of the lactam at a substantially constant value until it reaches the mixing head, wherein the lactam feeding means further comprises a pump configured to pump the lactam from the reservoir and to dose it towards the mixing head, the pump being located within the heater, the device further comprising an engine for controlling the dosing of the pump, the engine being outside said heater and joined to the pump by means of a shaft passing through a wall of said heater.

2. The device of claim 1, wherein the lactam feeding means further comprises a pressure meter configured to stop the pump in the event of overpressure, said pressure meter being located inside said heater, thus maintaining the temperature of said pressure meter at a substantially constant value.

3. The device of claim 1, wherein the lactam feeding means further comprises a relief valve configured to be mechanically activated for clearing the lactam in the event of exceeding a maximum working pressure, said relief valve being located within said heater, thus maintaining the temperature of said relief valve at a substantially constant value.

4. The device of claim 1, wherein the lactam feeding means further comprises a three-ways valve located between the reservoir and the pump, for enabling the communication of the material flow from the reservoir to the pump, or from the reservoir to a drainpipe for clearing the reservoir, said three-ways valve being located within said heater, thus maintaining the temperature of said three-ways valve at a substantially constant value.

5. The device of claim 1, further comprising an electro valve configured to open when the pump is working and to close when the pump stops, preventing dripping, once the dosing of the lactam is completed.

6. The device of claim 1, wherein the mixing head comprises a radial inlet for the lactam, a first inlet for the initiator and a second inlet for the activator, the first inlet being connected to a first pipe and the second inlet to a second pipe, so that the lactam flow enters the mixing head perpendicular to the output shaft while the initiator and activator enter in parallel, in such a way that the initiator and activator come out by the central part of the mixing head while the lactam flow does it by the perimeter part.

7. The device of claim 6, wherein the first dosing means for feeding the initiator comprises a syringe driver joined to the first inlet of the mixing head and the second dosing means for feeding the activator comprise a syringe driver joined to the second inlet of the mixing head.

8. The device of claim 1, wherein said mixing head is tempered by means of flat resistances, in order to prevent solidification of the lactam and keep the temperature of the mix under control.

9. The device of claim 1, wherein the mixing pipe is a static mixer.

10. The device of claim 1, wherein in use, the temperature inside the heater is between 100° C. and 115° C.

11. The device of claim 1, further comprising an electric resistor surrounding the reservoir configured to increase the temperature of the lactam inside the reservoir so that the lactam reaches a temperature between 135° C. and 150° C.

* * * * *